United States Patent [19]
Manico et al.

[11] Patent Number: 5,904,330
[45] Date of Patent: May 18, 1999

[54] WINDOW-MOUNTED CAMERA MOUNT AND BIRD FEEDER

[75] Inventors: Joseph A. Manico, Rochester; Richard N. Blazey, Penfield; Richard S. Keirsblick; John K. McBride, both of Rochester, all of N.Y.

[73] Assignee: Eastman Kodak Company, Rochester, N.Y.

[21] Appl. No.: 08/852,365

[22] Filed: May 7, 1997

[51] Int. Cl.[6] ................................................. A45D 42/14
[52] U.S. Cl. .................. 248/206.3; 248/174; 119/51.01; 119/57.8
[58] Field of Search ............................. 248/206.3, 205.3, 248/174; 355/21, 67; 396/419, 175; 119/51.01, 57.8, 61, 52.2; D6/571

[56] References Cited

U.S. PATENT DOCUMENTS

| | | |
|---|---|---|
| 3,291,100 | 12/1966 | Negaard . |
| 3,514,206 | 5/1970 | Harvey et al. ............................. 355/67 |
| 3,737,226 | 6/1973 | Shank ........................................ 355/67 |
| 4,261,294 | 4/1981 | Bescherer . |
| 4,361,116 | 11/1982 | Kilham . |
| 4,701,039 | 10/1987 | Johnson ................................. 355/67 X |
| 4,863,130 | 9/1989 | Marks . |
| 4,892,060 | 1/1990 | Lundquist . |
| 4,953,503 | 9/1990 | Lundquist . |
| 5,103,249 | 4/1992 | Keene ......................................... 396/6 |
| 5,246,193 | 9/1993 | Faidley . |
| 5,285,226 | 2/1994 | Frosig et al. . |

Primary Examiner—Leslie A. Braun
Assistant Examiner—Long Dinh Phan
Attorney, Agent, or Firm—Roger A. Fields

[57] ABSTRACT

A window-mounted camera mount and bird feeder comprises a camera mount having a plurality of spaced suction cups for adhering the camera mount to an inner side of a window unit, and a bird feeder having a plurality of spaced suction cups similar in number and in individual locations on the bird feeder to the number and individual locations of the plurality of suction cups on the camera mount, for adhering the bird feeder to an outer side of the window unit with the respective suction cups on the bird feeder aligned with the corresponding suction cups on the camera mount to achieve picture-taking alignment of the camera mount and the bird feeder.

6 Claims, 2 Drawing Sheets

WINDOW-MOUNTED CAMERA MOUNT AND BIRD FEEDER

FIELD OF THE INVENTION

The invention relates generally to the field of photography, and in particular to a window-mounted camera mount and bird feeder.

BACKGROUND OF THE INVENTION

It is generally known for bird feeders to include suction cups for adhering the bird feeder to the outside of a window pane. See prior art U.S. Pat. No. 4,953,503 issued Sep. 4, 1990, U.S. Pat. No. 4,361,116 issued Nov. 30, 1982, and U.S. Pat. No. 4,261,294 issued Apr. 14, 1981.

Similarly, it is known for camera mounts to include suction cups for adhering the camera mount to a car windshield as in prior art U.S. Pat. No. 5,246,193 issued Sep. 21, 1993, or to the inside of a glass window as in prior art U.S. Pat. No. 4,863,130, issued Sep. 5, 1989.

SUMMARY OF THE INVENTION

According to the invention, a window-mounted camera mount and bird feeder comprises:

a camera mount having a plurality of spaced suction cups for adhering the camera mount to an inner side of a window unit; and a bird feeder having a plurality of spaced suction cups similar in number and individual locations on the bird feeder to the number and individual locations of the plurality of suction cups on the camera mount, for adhering the bird feeder to an outer side of the window unit with the respective suction cups on the bird feeder aligned with the corresponding suction cups on the camera mount to achieve picture-taking alignment of the camera mount and the bird feeder.

DETAILED DESCRIPTION OF THE INVENTION

The invention is disclosed as being embodied preferably in a window-mounted camera mount and in a window-mounted bird feeder. Because the features of these devices are generally known, the description which follows is directed in particular only to those elements forming part of or cooperating directly with the disclosed embodiment. It is to be understood, however, that other elements may take various forms known to a person of ordinary skill in the art.

Figure 1:
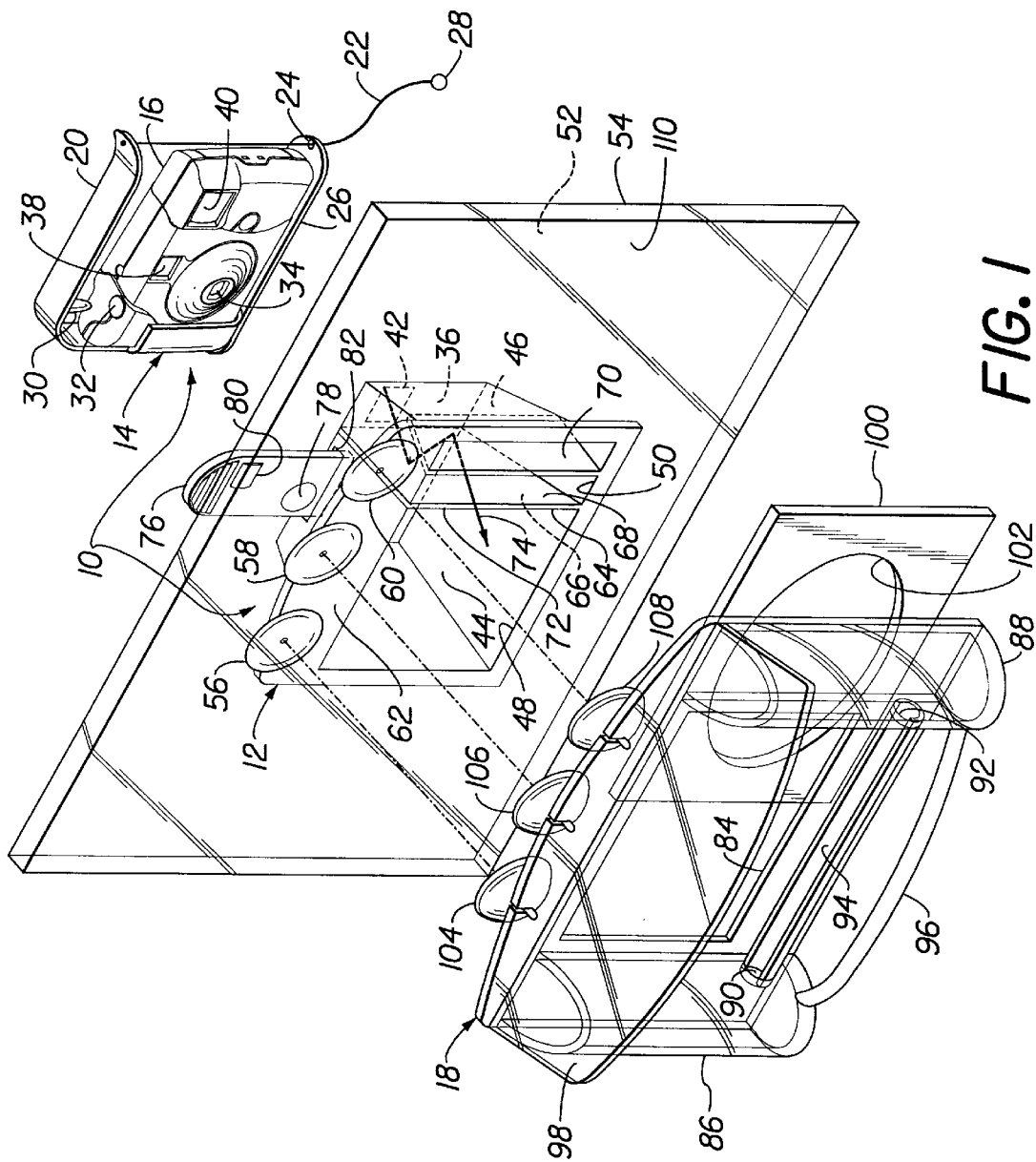
FIG. 1 is an exploded perspective view of a window-mounted camera mount and bird feeder pursuant to a preferred embodiment of the invention.

Referring now to the drawings, FIG. 1 shows a window camera mount 10 comprising a flash exposure housing 12 and a camera bracket 14 for removably holding a known type one-time-use camera 16, and a window bird feeder 18.

The camera bracket 14 includes a resilient integral lever 20 connected at a free end to a draw-string 22. The draw-string 22 extends through a hole 24 in a base 26 of the bracket 14. When the draw-string 22 is manually pulled at an end-ball 28, the lever 20 is pivoted to lower a plunger 30 depending from the lever against a shutter release button 32 of the one-time-use camera 16 to depress the shutter release button to take a picture.

The base 26 of the camera bracket 14 is connected to the flash exposure housing 12 via conventional means, such as screws or resilient clips, to position a taking lens 34 of the one-time-use camera 16 behind a round lens opening (not shown) in a housing end wall 36, to position a front viewfinder lens 38 of the one-time-use camera behind a rectangular viewfinder opening (not shown) in the same wall, and to position a flash emission lens 40 of the one-time-use camera behind a rectangular flash opening 42 in the same wall. See FIGS. 1 and 2.

The flash exposure housing 12 includes an exposure chamber 44 and a flash chamber 46 having respective co-planar rectangular end openings 48 and 50 arranged to be positioned flush against an inner side 52 of a windowpane 54 when the camera mount 10 is adhered to the inner side of the windowpane via three evenly spaced suction cups 56, 58 and 60 connected to a housing end wall 62. The housing end wall 62 is parallel to the housing end wall 36. The lens and viewfinder openings (not shown) in the housing end wall 36 are open to the exposure chamber 44, and the flash opening 42 in the same wall is open to the flash chamber 46. A baffle 64 having a non-reflecting side 66 in the exposure chamber 44 and a reflecting side 68 in the flash chamber 46 is inclined at a suitable angle between the exposure and flash chambers to prevent direct flash illumination of the windowpane at the end opening 50 of the flash chamber, and a reflector 70 is inclined in the flash chamber at a suitable angle to redirect flash illumination around the end 72 of the baffle indirectly to the windowpane to prevent reflection of the flash illumination from the windowpane. The flash illumination, as shown by the broken line 74 in FIG. 1, begins at the flash opening 42 in the housing end wall 36, then bounces off the reflecting side 68 of the baffle 64 and, in turn, bounces off the reflector 70 to exit the flash chamber 46 obliquely at the end opening 50 of the flash chamber.

A close-up device 76 having a known type close-up diopter 78 for the taking lens 34 of the one-time-use camera 16 and a known type close-up diopter 80 for the front viewfinder lens 38 of the one-time-use camera is insertable through a slot 82 into the exposure chamber 44. See FIGS. 1 and 2.

Figure 2:
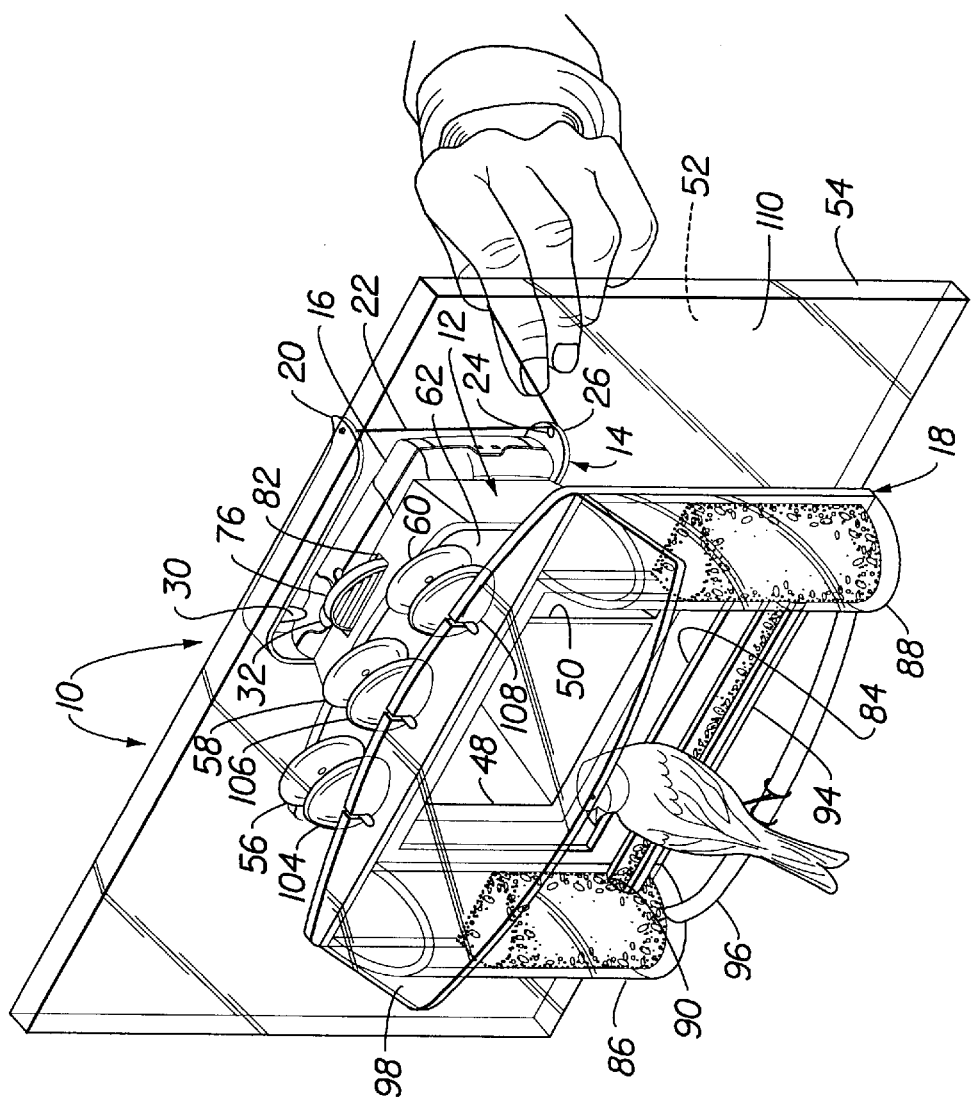
FIG. 2 is an assembled perspective view of the window-mounted camera mount and bird feeder shown in FIG. 1.

The bird feeder 18 has a rectangular opening 84 similar dimensionally to the combined dimensions of the end openings 48 and 50 of the exposure and flash chambers 44 and 46. As shown in FIGS. 1 and 2, the bird feeder 18 includes a pair of transparent feeder silos 86 and 88 that have respective opposed feeder holes 90 and 92 to a common feeder trough 94, a bird perch 96 within reach of the trough, and a hood 98. The hood 98 is translucent to admit some ambient light into the bird feeder 18 and to reflect some flash illumination within the bird feeder. An optional opaque frame 100 having an oval (or other shape) opening 102 can be connected to the bird feeder 18 over the rectangular opening 84. The bird feeder 18 has three evenly spaced suction cups 104, 106 and 108 that are at the same locations on the bird feeder as the respective locations of the three suction cups 56, 58 and 60 on the housing end wall 62. This permits the three suction cups 104, 106 and 108 to be adhered to an outer side 110 of the windowpane 54 in alignment with the suction cups 56, 58 and 60 as shown in FIG. 2, to effect picture-taking alignment of the camera mount 10 and the bird feeder 18 on the window pane.

The one-time-use camera 16 has a flash button 112 which, when momentarily depressed, readies the one-time-use camera for flash illumination each time a picture is taken. See FIG. 1. The flash button 112 is depressed before the one-time-use camera 16 is inerted in the camera bracket 14.

Alternatively, a recess (not shown) can be provided in the housing end wall 36 for accessing the flash button 112 when the window camera mount is assembled as shown in FIG. 2.

The invention has been described with reference to a preferred embodiment. However, it will be appreciated that variations and modifications can be effected by a person of ordinary skill in the art without departing from the scope of the invention.

PARTS LIST
10. window camera mount
12. flash exposure housing
14. camera bracket
16. one-time-use camera
18. window bird feeder
20. lever
22. draw-string
24. hole
26. base
28. end-ball
30. plunger
32. shutter release button
34. camera taking lens
36. housing end wall
38. camera viewfinder lens
40. flash emission lens
42. flash opening
44. exposure chamber
46. flash chamber
48. end opening
50. end opening
52. inner side
54. window pane
56. suction cup
58. suction cup
60. suction cup
62. housing end wall
64. baffle
66. non-reflecting side
68. reflecting side
70. reflector
72. end of baffle
74. broken line
76. close-up device
78. close-up diopter
80. close-up diopter
82. slot
84. rectangular opening
86. feeder silo
88. feeder silo
90. feeder hole
92. feeder hole
94. feeder trough
96. bird perch
98. hood
100. frame
102. oval opening
104. suction cup
106. suction cup
108. suction cup
110. outer side
112. flash button

What is claimed is:

1. A window-mounted camera mount and bird feeder comprising:
   a camera mount having a plurality of spaced suction cups for adhering said camera mount to an inner side of a window unit; and
   a bird feeder having a plurality of spaced suction cups similar in number and individual locations on said bird feeder to the number and individual locations of the plurality of suction cups on said camera mount, for adhering the bird feeder to an outer side of the window unit with the respective suction cups on the bird feeder aligned with the corresponding suction cups on the camera mount to achieve picture-taking alignment of the camera mount and the bird feeder.

2. A window-mounted camera mount and bird feeder as recited in claim 1, wherein said camera mount includes an exposure chamber and a flash chamber having respective openings arranged to be positioned against the inner side of a windowpane when the camera mount is adhered to the inner side of the window unit, a baffle arranged between said exposure and flash chambers to prevent direct flash illumination of the windowpane, and a reflector arranged in said flash chamber to redirect flash illumination around said baffle indirectly through said opening of said flash chamber to the windowpane to prevent reflection of the flash illumination from the windowpane.

3. A window-mounted camera mount and bird feeder as recited in claim 2, wherein said bird feeder has an opening that is similar dimensionally to the combined dimensions of said openings of the exposure and flash chambers.

4. A window-mounted camera mount and bird feeder as recited in claim 3, wherein a frame having an opening smaller than said opening of the bird feeder is insertable between that opening and said openings of the exposure and flash chambers.

5. A window-mounted camera mount and bird feeder as recited in claim 2, wherein a close-up device having a close-up diopter for a camera taking lens and a close-up diopter for a camera viewfinder is insertable into said exposure chamber.

6. A window-mounted camera mount and bird feeder as recited in claim 1, wherein said bird feeder includes a translucent hood to admit some ambient light into said bird feeder and reflect some flash illumination in the bird feeder.

* * * * *